Feb. 9, 1932.    R. R. HARMON    1,844,850
APPARATUS FOR CLEANING BLAST FURNACE GAS
Filed Feb. 27, 1929
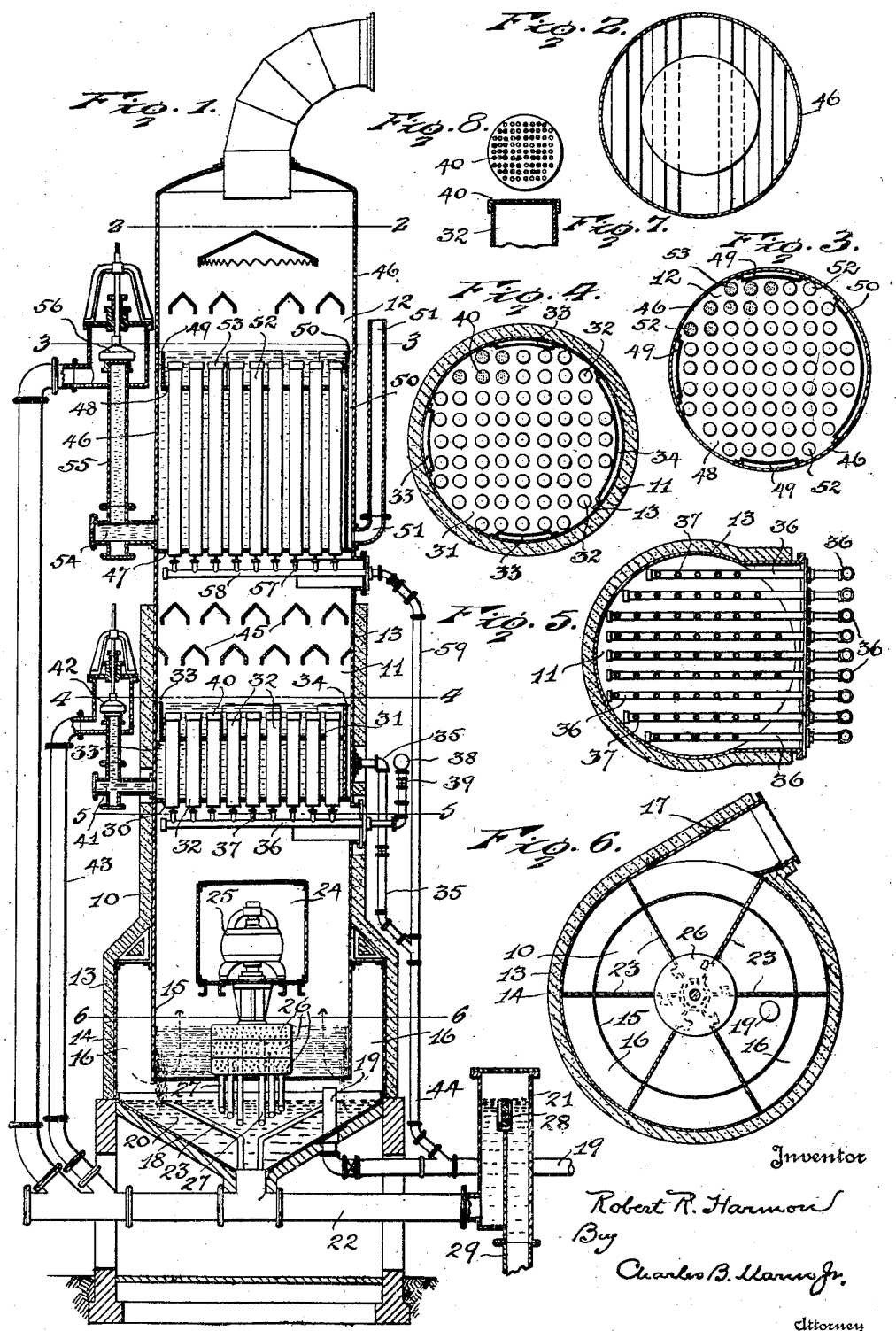
Inventor
Robert R. Harmon
By
Charles B. Harris Jr.
Attorney Patented Feb. 9, 1932

1,844,850

UNITED STATES PATENT OFFICE

ROBERT R. HARMON, OF BALTIMORE, MARYLAND, ASSIGNOR TO PEABODY ENGINEERING CORPORATION, OF NEW YORK, N. Y., A CORPORATION OF NEW YORK

APPARATUS FOR CLEANING BLAST FURNACE GAS

Application filed February 27, 1929. Serial No. 343,032.

This invention relates to an improved apparatus for cleaning blast-furnace gas.

Complete cleaning of blast furnace gas requires the removal of suspended particles of ore dust, coke breeze, silica and alumina which exist in sizes varying from colloids upward to particles the size of a pin head. Added to these constituents, as dust, are condensed alkali substances which have previously been volatilized in the furnace and these latter substances, which are also mixed with traces of lead, zinc, arcenic, etc., are commonly known as fumes or metallurgical smoke.

In view of the disperse nature of these colloidal substances their complete removal becomes a matter of energy input requirements, and to eliminate them by means of mechanical energy, requires the contact of each separate particle with a force sufficient for its precipitation, by agglomerating with other particles or by causing it to adhere to some wet surfaces or to become coated with a liquid film.

To actually accomplish this requires that the entire gas volume be broken up into approximately as many sub-divisions as there are particles present to be captured, since each particle is enveloped in a sphere of gaseous medium. This theory is strengthened by an analysis of the cleaning curves for any mechanical device working with water as a liquid medium and attempting to disintegrate the gas or gas and water. The decrease in concentration of suspended dust particles with each successive contact between the gas and liquid occurs rapidly with the first several units, but the removal efficiency falls off as the curve approaches the limiting concentration (zero) of the dust remaining in the gas.

Since I have come to consider the removal of colloidal dust particles from a gaseous medium, or, in more scientific language, the destruction of a disperse system, as a function of certain definite energy requirements, I am able to point out certain potentials within the gas itself which, if properly utilized, will effect this destruction with but little expenditure of energy from an outside source.

Blast-furnace gas, besides being dust and fume laden, is also hot and laden with water vapor, the gas normally containing 15 to 25 per cent, by volume, in the raw state.

I have discovered that the mechanics of the dust removal procedure as universally practiced, is wrong, particularly in the following respects:

(1) Cleaning and cooling as heretofore practiced are intimately tied together in the same unit and the accomplishment of the one, viz., cooling, is effected at the expense of the other.

(2) Cleaning and cooling are effected by the injection of cold water spray into the gas stream. Because of this, superheat of the gas is lost through rapid chilling before the compensating temperature is reached. In other words, the compensating temperature is a point of theoretical maximum saturation of the gas in which all superheat is utilized to vaporize water. This is attained only by conducting the cooling process in stages, and not by shock cooling as heretofore conducted.

(3) Even though the compensating temperature were actually realized and all superheat made available for vaporizing water, resulting condensation in the cooling stage will not permit of maximum dust removal, because, the injection of the cooling water as spray, produces water nuclei upon which condensation will take place in preference to dust nuclei. Condensation will always take place on the larger of two nuclei, and since the drop formed by the water spray is much larger than the dust particle, the former is selected.

My invention therefore has among its objects to provide an improved apparatus wherein the thermal energy in the gas will be retained in the raw gas while depleting the gas of dust; to use all superheat in the gas as latent heat of vaporization to form a saturated gas whose dew point will be above that of the normal gas, through intimate contact with hot water; to strip out or remove the greater portion of the dust originally in the gas by intimate contact with hot water, either in the form of spray or bubbles, keeping the gas at its compensating temperature; to cool the gas by surface cooling, preferably, to force the normal water vapor in the gas to condense upon the dust nuclei to effect the removal of the latter and eliminate the dust particles held in the water entrainment, by liquid filtration, that is, by bubble washing of droplets that have been formed by condensation about the dust.

One of the important features of my invention resides in the indirect cooling of the gas, in the absence of water sprays and the droplets which such sprays form, and compelling all of the water vapor in the gas to condense directly on the dust nuclei, for I have discovered that, instead of forming water droplets as heretofore, that if I avoid the formation of such droplets, I compel the dust nuclei in the gas to serve as the sole surfaces on which the vapor in the gas will condense and these condensation-coated dust particles are then readily carried off.

With these, and other objects in view, the invention is illustrated in the accompanying drawings, wherein,—

Fig. 1 shows in vertical sectional elevation, one form of apparatus for carrying out the invention.

Fig. 2 illustrates a cross-sectional detail through the same,—the section being taken on the line 2—2 of Fig. 1.

Fig. 3 shows another cross-sectional detail through the apparatus as viewed on the line 3—3 of Fig. 1.

Fig. 4 illustrates a cross-sectional detail,—the section being taken on the line 4—4 of Fig. 1.

Fig. 5 shows another cross-sectional detail through the apparatus,—the same being taken on the line 5—5 of Fig. 1.

Fig. 6 illustrates a cross-section detail on the line 6—6 of Fig. 1.

Fig. 7 shows a sectional detail of one of the tube-heads, and

Fig. 8 illustrates the same in top view.

Referring to the drawings, the apparatus in the form disclosed is of the tower type, having in this instance, a lower or stripper zone 10 in which the grosser nuclei are removed; an intermediate humidifying and diffusing or mixing zone 11 and an upper condensing zone 12 for the removal of lesser nuclei and colloidally condensed water.

The lower and intermediate zones are formed within an insulated shell structure 13 which latter, around its base is enlarged at 14.

On the interior of the lower zone of the shell there is a depending annular shell-portion 15 between which and the enlarged portion 14, an annular internal passage 16 is formed.

A tangential passage 17, shown in Fig. 6, is provided in the lower zone portion through which the raw gas to be cleaned passes into the annular passage 16 and through centrifugal force any heavy dust particles may be thrown out.

Beneath the annular passage 16 and the depending annular shell portion 15, there is an inverted cone bottom 18, into which a pipe 19 extends, which pipe conveys hot clear water 20, from a clarifier, the hot clear water in the cone-bottom being maintained at a uniform level by means of a trap-structure 21 which is connected to the center of the cone-bottom by means of a conduit 22.

In this instance, the level of the hot water in the cone-bottom 18 is slightly below the lower edge of the annular depending shell 15.

I provide a series of up-standing ribs or flanges 23 on the upper side of the cone-bottom for a purpose that will presently be explained.

A motor tunnel 24 is provided in the lower or stripper zone portion 10 of the apparatus and a motor 25 is located therein. The shaft of the motor depends into the center of the annular shell 15 and carries a series of annular sprayers 26,—the sprayers in this instance, consisting of three annular compartments separated by horizontal partition plates and closed at the top and bottom by imperforate plates but having annular or circumferential perforated plates through which hot water may be thrown by centrifugal action.

The bottom of each sprayer compartment has a series of depending tubes 27,—the tubes from the intermediate compartment extending through the lower compartment and the bottom of the latter, and the tubes from the upper compartment extending down through the compartments beneath it and below the lowermost compartment.

It will be noted that the tubes vary in length so that they will not all terminate at their lower ends in the same horizontal plane, and it will further be noted that the lower ends of the tubes have elbow ends and that all of them dip into the hot water in the cone-bottom 18.

It will be obvious that when the motor revolves the several sprayers 26, the depending tubes will travel in a circular path through the hot water and will therefore scoop up the water and convey it to the several sprayer compartments above from which it will be thrown laterally, by centrifugal force, from the perforated circumferential plates of the compartments across the interior of the shell 15 and against the annular wall of the latter.

The purpose of the up-standing ribs or flanges 23 on the upper side of the cone-bottom is to prevent swirling of the hot water as the depending tubes 27 travel in a circular path therethrough.

It will thus be noted that the water thus sprayed laterally in the lower stripper zone is hot and as the hot gas passes under the lower edge of the shell 15, it must first pass through the stream of hot water flowing down the wall of the shell and then up through the spray of hot water extending laterally across the interior of the shell.

While I have shown one form of spraying mechanism, it is to be understood that the present invention is not to be limited to this form for the real idea involved at this point is to subject the hot gas to the action of a spray of hot water whereby to keep the temperature of the gas up and not cool the hot gas by bringing it into contact with water that will chill the gas at this stage; to act as a stripper for coarse nuclei, and further serve as a shock absorber to prevent dust passing through with quick surges of gas.

The trap structure 21, has an adjusting device 28 in order to maintain a predetermined hot water level above the lower ends of the tubes 27, and the dust-laden water in the cone-bottom passes by conduit 22 to the trap and is conveyed from the latter by conduit 29 to a thickener or clarifier.

The hot gas next passes to the upper insulated portion of the shell structure into a zone which I term humidifying and diffusing or mixing zone 11.

In this zone 11, I provide horizontal lower and upper tube-sheets 30 and 31 respectively with a series of vertical diffusing tubes 32, whose lower ends extend through the lower tube-sheet 30 and whose upper ends project above said upper tube-sheet 31 forming a space for a heating agent such as hot water, between the upper side of said upper tube-sheet and the upper ends of the diffusing tubes 32 for a purpose that will presently be explained.

The lower tube sheet has a tight connection with the interior of the annular insulated shell 13, but a plurality of vertical passages 33, are provided around the periphery of the upper tube-sheet from the lower to the upper side thereof.

At one side of this zone 11, I provide a vertical wall forming a vertical passage 34 which extends from the lower tube-sheet 30 up through the hot water space and through the upper tube-sheet 31 to a point on a level with, or above, the upper ends of the vertical overflow passages 33.

This vertical wall and passage 34 is located at the inner side of the insulated shell-wall, and a hot water supply-pipe 35 enters the side of the shell and constantly supplies hot water to the water space between the lower and upper tube-plates 30 and 31 and about the diffusing tubes 32 extending vertically therethrough and up through which the gas must pass.

In case the gas when entering the lower ends of the diffusing tubes 32 does not possess sufficient thermal energy to give the desired saturation ratio, its thermal energy may be increased by means of steam or hot water, sprayed into the gas within the passages of the tubes.

In the present instance, I show a series of horizontal pipes 36 extending through the insulated shell from the exterior, each of which is capped at its inner end, and each of these pipes extends beneath the lower open ends of a row of vertical diffusing tubes 32 and has a nozzle 37 directly beneath each tube.

Steam will be fed to these pipes 36, from a header 38, and a valve 39, which is thermostatically controlled, controls the passage of steam through the pipes 36 and nozzles 37.

The up-flowing gas is therefore broken up into a series of streams by passing up through the tubes, and by then directing the steam from the nozzles into the tubes, a more intimate mingling of the steam or water vapor with the gas is attained in the short time of its passage through the tubes.

The upper end of each tube 32 is provided with a perforated head plate 40, (see Figs. 7 and 8) and the gas, steam and vapors are passed through these perforated plates in order that a thorough and additional mixing may be effected.

It will be noted that in the structure disclosed, the upper ends of the tubes 32 are submerged in hot water which is retained above the upper tube-sheet 31 as well as around the tubes between said upper plate and the lower tube-plate,—the level of hot water being maintained by means of an overflow pipe 41 and an adjustable trap 42.

From the perforated head plates at the upper ends of the tubes, the mixture of gases and vapors passes into and through the body of hot water maintained in and about the tubes to secure an ultimate diffusing and humidifying action.

The overflow water from trap 42, is carried off by pipe 43, into conduit 22 and passes to the thickener or clarifier as does the dust laden water from the cone-bottom. The clarified hot water is then pumped through pipe 19 and branch pipes 44 and 35 and is again utilized.

To prevent entrained moisture from being carried with the gas issuing from the hot water in the humidifying and diffusing or mixing zone 11, I provide this zone with a series of impingement baffles 45, which are preferably arranged in staggered relation and in a plurality of horizontal rows, above the level of the water.

The next stage in the method as carried on by the apparatus is what I term the condensing stage, where indirect cooling of the gas streams take place and condensation occurs upon the remaining fine dust nuclei present, thus wetting and removing them.

In this condensing stage, I omit the insulation from around the annular shell portion 46 and provide lower and upper horizontal tube sheets 47 and 48 in said shell which sheets extend all the way across and have tight joint with the interior annular wall-surface of that shell.

A plurality of vertical passages 49 are formed on the interior of the shell from the lower to, and above, the upper side of the upper tube-sheet 48, and at one side there is provided a vertical water-supply passage 50 which extends from a point above the upper tube-sheet 48 down to the lower tube-sheet.

A cold water supply pipe 51 enters the shell portion 46 and supplies cold water to the vertical passages 50.

A series of vertical tubes 52, extend up through the lower tube-sheet 47 and also through and above the upper tube-sheet 48, but terminate in a horizontal plane below the upper ends of the vertical passages 49 and 50. These vertical tubes each have a perforated cap 53 on the upper end, but the lower ends, beneath the lower tube-sheet 47, are wide open.

It will thus be understood that a water circulating chamber is formed in the shell between the tube-sheets 47 and 48 and that the tubes 52 extend through the cool water in this chamber.

An outlet pipe 54 extends from the bottom of the water-chamber and connects with a pipe 55 leading to an adjustable trap 56 at the side of the shell which trap controls the level of water on top of the upper tube-sheet 48.

The level of this water is maintained above the capped upper ends of the tubes 52 so that gas passing up through those tubes must bubble through the water over the upper outlet-ends of the tubes.

Cold water, therefore, from the vertical passage 50 flows over the perforated cap-ends of the tubes 52 above the upper tube-sheet 48, and then passes down through the passages 49 to the water chamber between the two tube-sheets where it circulates around the tubes, and thus acts to cool the gas indirectly during its passage through the tubes, and condenses the water vapor in the gas on and about the fine dust particles and forms minute droplets, while the cooling water finally passes out through pipes 54 and 55 to and through the trap 56.

In order to prevent water dripping through the perforated caps on the upper ends of the tubes 52, the velocity of the gas through the tubes and perforations is gauged so as to overcome any possible water-head over the perforated caps.

In this manner, as the gas passes up through the chilled tubes 52, indirect cooling takes place and condensation of the water vapor in the gas occurs upon the remaining fine dust nuclei present, thus wetting and agglomerating them and removing them from the gas stream. Aggregates of these tiny dust particles will also be collected by the tiny droplets formed by condensation on the interior gas passages of the tubes and these are either washed down the inside walls of the tubes by the water condensed out of the gas or are picked up again by the gas, due to its velocity, and carried through the caps into the water above.

In order to prevent any deposition and building up of dust within the tubes 52, I provide spray heads 57 from a plurality of horizontal pipes 58, which extend to the outside of the shell and are connected to a pipe 59 through which hot water may be supplied periodically and projected into the tubes from the spray-heads to flush out the tubes.

In the process of condensation upon nuclei, infinitesimal in size, as treated here, the maximum degree of subdivision of water vapor is induced by the degree of subdivision of the nuclei, hence water droplets, formed by condensation about the dust particles, result, which approach the magnitude of grosser dust particles. It is therefore necessary to provide means for eliminating these droplet-encased dust-particles.

This is accomplished by passing the gas through the series of apertures at the upper ends of the tubes into the sheet of water and these tiny droplet-encased dust-particles are readily merged into the body of water and their removal is thus completed.

Having described my invention, I claim,—

1. An apparatus for cleaning gas having means for breaking up the gas into a plurality of streams, means for intimately mingling a heating agent with the broken-up streams of gas, means for maintaining a moving body of hot water through which the gas must pass to effect a diffusing and humidifying action thereon and means for cooling the gas to effect condensation of the vapor and water in the gas about the dust particles.

2. An apparatus for cleaning gas having means for breaking up the gas into a plurality of streams, means for intimately mingling a heating agent with the gas, means for maintaining a body of hot water through which the combined streams of gas and heating agent must pass to secure a diffusing and humidifying action thereon, means for dividing the vapor laden heated gas into a plurality of streams and means for cooling the streams of gas to effect condensation of the vapor therein about the dust particles in the gas.

3. An apparatus for cleaning gas having means through which the gas to be cleaned flows, means for intimately mixing steam or water vapor with the stream of flowing gas, means for maintaining a body of hot water through which the gas and its vapor laden mixture must pass and means for condensing the vapor from the gas about the dust-particles therein to produce droplets whereby the latter will form vehicles for removing the fine dust nuclei from the gas.

4. An apparatus for cleaning gas having a vessel through which the gas to be cleaned flows, a series of tubes in said vessel through which the gas passes in streams, means for injecting steam into the streams of gas, means for maintaining a moving body of hot water over the outlet-ends of the tubes through which hot water the gas must pass and means beyond the body of hot water for condensing the vapor in the gas.

5. An apparatus for cleaning gas having a vessel through which the gas to be cleaned flows, means for humidifying the gas by mingling steam or water vapor therewith, means for maintaining a moving body of hot water through which the humidified gas must pass and means beyond the moving body of hot water for condensing the vapor in the gas about the dust particles in the gas and produce droplets whereby the latter will serve as vehicles to carry off the dust nuclei in the gas.

6. An apparatus for cleaning gas having a vessel through which the gas to be cleaned flows, means for humidifying the gas by mingling steam or water vapor therewith, means for maintaining a moving body of hot water through which the humidified gas must pass, a number of cooling surfaces beyond the moving body of hot water to effect a condensation of the vapor in the gas about the dust particles by indirect cooling and means for maintaining a body of cooling water beyond the said condensing surfaces into which the gas and condensation-encased dust particles pass.

7. An apparatus for cleaning gas having a stripping zone into which hot gas enters, means for providing a spray of hot water through which the hot gas passes to aid in keeping the gas hot, means beyond the spraying means for injecting steam into the hot gas to humidify the latter and a number of cooling tubes beyond the steam-injecting means for breaking up the gas into streams and indirectly condensing the vapor in the gas about the dust particles to produce droplets around the dust particles whereby the droplets may serve to hold the dust nuclei, and means for maintaining a moving body of cooling water beyond the condensing tubes for carrying off the droplets and the dust nuclei about which the droplets are formed.

8. An apparatus for cleaning gas having a stripping zone into which hot gas enters, means for providng a spray of hot water through which the hot gas passes to preserve the heat in the gas, means independent of said latter means for humidifying the gas by mingling steam or water vapor therewith, means for maintaining a moving body of hot water of uniform depth through which the humidified gas must force its way, a number of cooling surfaces above the moving body of hot water to effect a condensation of the vapor in the gas about the dust particles by cooling, and means above the cooling surfaces for maintaining a body of cooling water into which the gas and condensation-encased dust particles pass.

9. An apparatus for cleaning gas comprising a vertical vessel having an inlet at the bottom for hot gas and an outlet near the top,—said apparatus vessel being provided with a stripping zone at the bottom into which hot gas enters, means in the lower stripping zone for providing a spray of hot water through which the hot gas passes, means in said vessel above the spraying means for injecting steam into the hot gas to humidify the latter, and means for maintaining a horizontal body of water across the vessel above the steam-injecting means for condensing the vapor in the gas about the dust particles therein.

10. An apparatus for cleaning continuously-flowing gas having means for breaking up the gas into a plurality of streams, means for intimately mingling a heating agent with the broken-up streams of gas and means for maintaining a continuously-flowing body of hot water across the path of the streams of gas and heating agent through which moving body of water the gas and heating agent must pass whereby to secure a diffusing and humidifying action thereon.

In testimony whereof I affix my signature.

ROBERT R. HARMON.